(12) United States Patent
Kawano et al.

(10) Patent No.: US 9,103,330 B2
(45) Date of Patent: Aug. 11, 2015

(54) MOTOR, DISK DRIVE APPARATUS, AND FAN

(71) Applicant: NIDEC CORPORATION, Kyoto (JP)

(72) Inventors: Yosuke Kawano, Kyoto (JP); Yusuke Iwai, Kyoto (JP); Hidehiko Hidaka, Kyoto (JP)

(73) Assignee: NIDEC CORPORATION, Kyoto-shi (JP)

( * ) Notice: Subject to any disclaimer, the term of this patent is extended or adjusted under 35 U.S.C. 154(b) by 373 days.

(21) Appl. No.: 13/748,954

(22) Filed: Jan. 24, 2013

(65) Prior Publication Data

US 2013/0236340 A1  Sep. 12, 2013

(30) Foreign Application Priority Data

Mar. 7, 2012 (JP) .................................. 2012-050240

(51) Int. Cl.
| | | |
|---|---|---|
| *H02K 7/09* | (2006.01) | |
| *F04B 17/03* | (2006.01) | |
| *G11B 19/20* | (2006.01) | |
| *F04D 25/06* | (2006.01) | |

(52) U.S. Cl.
CPC ............ *F04B 17/03* (2013.01); *F04D 25/0646* (2013.01); *G11B 19/2009* (2013.01)

(58) Field of Classification Search
None
See application file for complete search history.

(56) References Cited

U.S. PATENT DOCUMENTS

| | | |
|---|---|---|
| 2007/0278876 A1 | 12/2007 | Haga et al. |
| 2008/0278027 A1 | 11/2008 | Ikemoto et al. |
| 2011/0047560 A1 | 2/2011 | Hidaka et al. |
| 2011/0047561 A1 | 2/2011 | Hidaka et al. |
| 2011/0084575 A1* | 4/2011 | Kim .............................. 310/425 |
| 2012/0169186 A1* | 7/2012 | Han ............................ 310/67 R |

FOREIGN PATENT DOCUMENTS

| | | |
|---|---|---|
| JP | 2000-166171 A | 6/2000 |
| JP | 2008-283759 A | 11/2008 |
| JP | 2012-165541 A | 8/2012 |
| KR | 10-2011-0083119 A | 7/2011 |

* cited by examiner

*Primary Examiner* — Tran Nguyen
(74) *Attorney, Agent, or Firm* — Westerman, Hattori, Daniels & Adrian, LLP

(57) ABSTRACT

There is provided a motor including, a rotating portion and a stationary portion. The mounting plate includes a substantially cylindrical fixing cylindrical portion; an annular upper plate portion; an annular circumferential portion; and a mounting portion. A lower end of the fixing cylindrical portion is arranged at a level lower than that of a lower end of a bushing press-fit area. At least one of a lower end of a sleeve fixing area in which an outer circumferential surface of the sleeve and an inner circumferential surface of the bushing cylindrical portion are in contact with each other and a lower end of a radial gap which supports the shaft is arranged at a level higher than that of an upper end of the bushing press-fit area.

28 Claims, 13 Drawing Sheets

MOTOR, DISK DRIVE APPARATUS, AND FAN

BACKGROUND OF THE INVENTION

1. Field of the Invention

The present invention relates to an electric motor. In particular, the present invention relates to a motor used in a disk drive apparatus or a fan.

2. Description of the Related Art

In a motor 80 disclosed in FIG. 22 of JP-A 2008-283759, a housing 32 is supported by a mounting plate 34b. The mounting plate 34b includes a plate-shaped portion 341b, an attachment portion 342b, and an adjustment portion 343. The adjustment portion 343 is defined between the plate-shaped portion 341b and the attachment portion 342b. The attachment portion 342b is defined by fluing performed upward in an axial direction.

A spindle motor described in US 2011/0084575 includes a base plate 400 including a reverse burring part 500. The reverse burring part 500 includes a core support part 510 and a burring hole 520. The core support part 510 includes a round part 512 and a core contact part 514. A burring part 522 of the reverse burring part 500 is arranged to extend downward. A bearing housing 300 is joined to the burring part 522.

JP-A 2000-166171 discloses a small-sized motor. The small-sized motor includes a core holder 25. The core holder 25 is arranged to hold a stator core 5 with portions of the core holder 25 holding the stator core 5 from both sides in an axial direction. The core holder 25 is fixed to an outer circumference of a bearing holder 3 by an elastic force.

In the case of the motor illustrated in FIG. 22 of JP-A 2008-283759, once the housing 32 is press fitted and thereby fixed to the mounting plate 34b, the housing 32 is held by only a small region of an inner circumferential surface of the mounting plate 34b through press fit. Therefore, the housing 32 tends to be easily tilted, and designing a mechanism to prevent a tilt of a rotation axis may be difficult depending on specifications of the motor.

In the spindle motor described in US 2011/0084575, both an inner circumferential surface and an outer circumferential surface of a bearing 200 radially overlap with a fixing range over which the burring part 522 is fixed to the bearing housing 300, and the inner circumferential surface of the bearing 200 tends to be easily deformed by press fitting of the bearing housing 300 to the burring part 522. Moreover, a lower end of the burring part 522 is arranged at a level higher than that of a lower end of the bearing housing 300, and secure support of the bearing housing 300 is not achieved.

SUMMARY OF THE INVENTION

A motor according to a preferred embodiment of the present invention includes a rotating portion, and a stationary portion arranged to support the rotating portion such that the rotating portion is rotatable about a central axis. The rotating portion includes a shaft and a rotor magnet. The stationary portion includes a sleeve including a hole in which the shaft is inserted, and arranged to rotatably support the shaft; a bushing having a bottom and being substantially cylindrical and arranged to cover the sleeve; a mounting plate arranged to have the bushing fixed thereto; and a stator arranged around the bushing radially inside the rotor magnet. The stator includes a stator core and coils. The bushing includes a substantially cylindrical bushing cylindrical portion arranged to have the sleeve inserted therein, and a bushing bottom portion arranged to close a lower end of the bushing cylindrical portion. The mounting plate includes a substantially cylindrical fixing cylindrical portion arranged to have a lower portion of the bushing cylindrical portion press fitted thereto; an annular upper plate portion arranged to extend radially outward from an upper portion of the fixing cylindrical portion; an annular circumferential portion arranged to extend downward from an outer edge of the annular upper plate portion; and a mounting portion arranged to extend radially outward from a lower portion of the annular circumferential portion. A lower end of the fixing cylindrical portion is arranged at a level lower than that of a lower end of a bushing press-fit area in which an inner circumferential surface of the fixing cylindrical portion and an outer circumferential surface of the bushing cylindrical portion are in contact with each other. At least one of a lower end of a sleeve fixing area in which an outer circumferential surface of the sleeve and an inner circumferential surface of the bushing cylindrical portion are in contact with each other and a lower end of a radial gap defined between an inner circumferential surface of the sleeve and an outer circumferential surface of the shaft and which supports the shaft is arranged at a level higher than that of an upper end of the bushing press-fit area.

A disk drive apparatus according to a preferred embodiment of the present invention includes the above-described motor arranged to rotate a disk; an access portion arranged to perform at least one of reading and writing of information from or to the disk; and a housing arranged to contain the motor and the access portion.

A fan according to a preferred embodiment of the present invention includes the above-described motor and an impeller cup attached to the rotating portion.

The present invention is able to achieve an improvement in strength with which a mounting plate and a bushing arranged to accommodate a sleeve are fixed to each other while preventing a deformation of an inner circumferential surface of the sleeve.

DETAILED DESCRIPTION OF THE PREFERRED EMBODIMENTS

Figure 2:
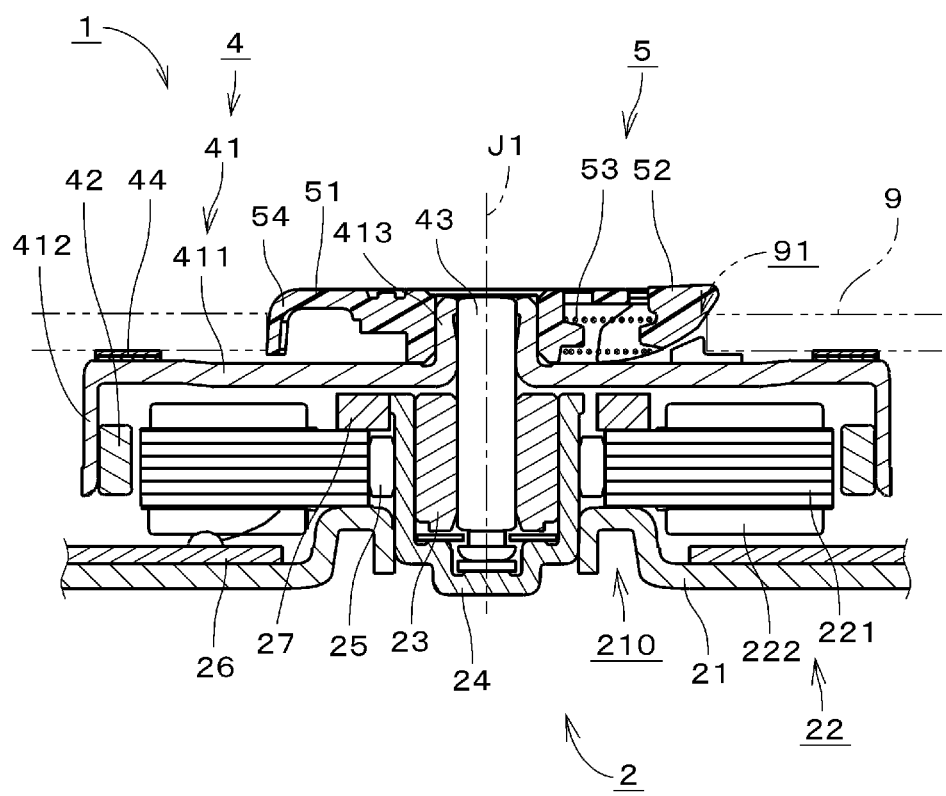
FIG. 2 is a cross-sectional view of a motor according to the above preferred embodiment.

It is assumed herein that a vertical direction is defined as a direction in which a central axis of a motor extends, and that an upper side and a lower side along the central axis in FIG. 2 are referred to simply as an upper side and a lower side, respectively. It should be noted, however, that the above definitions of the vertical direction and the upper and lower sides should not be construed to restrict relative positions or directions of different members or portions when the motor is actually installed in a device. Also note that a direction parallel to the central axis is referred to by the term "axial direction", "axial", or "axially", that radial directions centered on the central axis are simply referred to by the term "radial direction", "radial", or "radially", and that a circumferential direction about the central axis is simply referred to by the term "circumferential direction", "circumferential", or "circumferentially".

Figure 1:
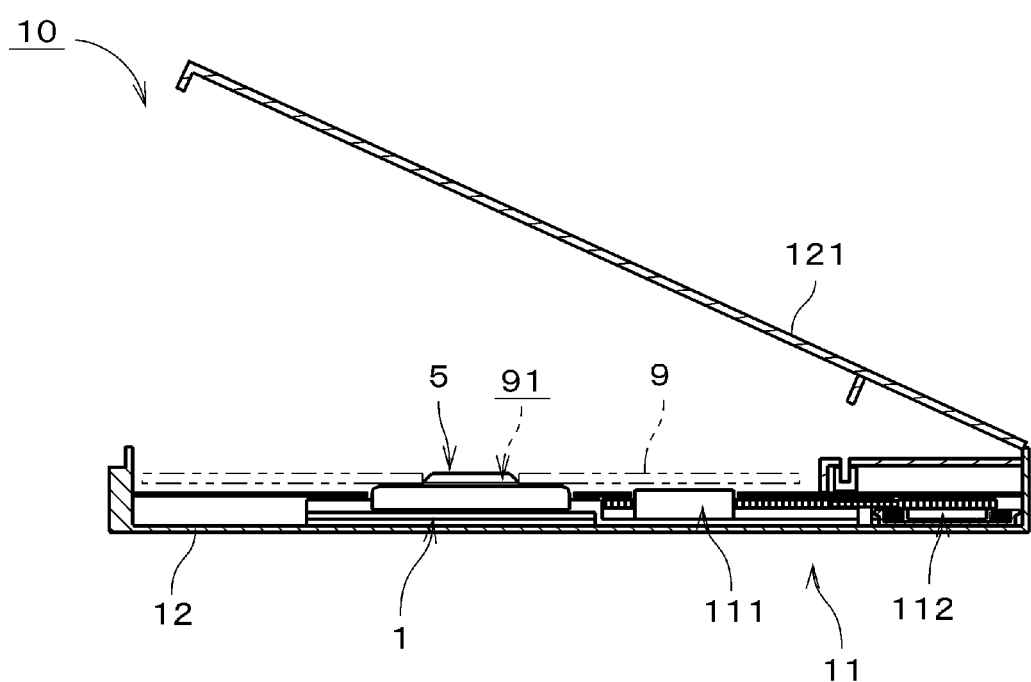
FIG. 1 is a cross-sectional view of a disk drive apparatus according to a preferred embodiment of the present invention.

FIG. 1 is a cross-sectional view of a disk drive apparatus 10 according to a preferred embodiment of the present invention. The disk drive apparatus 10 includes a motor 1, an access portion 11, and a housing 12. The housing 12 is in the shape of a box, and is arranged to contain the motor 1 and the access portion 11. The motor 1 is a slim motor, and has a height of a few millimeters to ten and a few millimeters. The motor 1 includes a chucking device 5 fitted in a central hole 91 of a disk 9, and the disk 9 is fixed by the chucking device 5. The access portion 11 includes a head 111 and a head actuator mechanism 112. The head 111 is an optical pickup mechanism arranged to perform at least one of reading and writing of information from or to the disk 9. A Blu-ray disc is used as the disk 9, for example. Another type of optical disk may be used as the disk 9.

The head actuator mechanism 112 is arranged to move the head 111 relative to the motor 1 and the disk 9. The head 111 includes a light emitting portion and a light receiving portion. The light emitting portion is arranged to emit a laser beam toward a lower surface of the disk 9. The light receiving portion is arranged to receive a light reflected from the disk 9. The housing 12 includes a cover portion 121 at a top thereof. The cover portion 121 is opened and closed when the disk 9 is mounted on or removed from the disk drive apparatus 10. In the disk drive apparatus 10, the disk 9 is caused to rotate by the motor 1, and the head actuator mechanism 112 moves the head 111 to a desired position.

FIG. 2 is a vertical cross-sectional view of the motor 1. In FIG. 2, the disk 9 is represented by a chain double-dashed line. The motor 1 includes a stationary portion 2, which is a stationary assembly, a rotating portion 4, which is a rotating assembly, and the chucking device 5. The rotating portion 4 is arranged above the stationary portion 2. The stationary portion 2 is arranged to support the rotating portion 4 such that the rotating portion 4 is rotatable about a central axis J1. The chucking device 5 is arranged on a top portion of the rotating portion 4.

The stationary portion 2 includes a substantially plate-shaped mounting plate 21, a stator 22, a sleeve 23, a bushing 24, a spacer 25, a circuit board 26, and an annular preload magnet 27. The mounting plate 21 is made of a metal. The bushing 24 is fixed to a central portion 210 of the mounting plate 21. The central portion 210 is a portion of the mounting plate 21 which is bent into the shape of an upward projecting rest. The bending of the central portion 210 improves rigidity of the central portion 210.

The bushing 24 has a bottom and is substantially cylindrical, and is arranged to cover an outer circumference of the sleeve 23. The sleeve 23 is thus accommodated in the bushing 24. The stator 22 is arranged around the bushing 24 with the spacer 25 intervening therebetween. The stator 22 includes a stator core 221 and a plurality of coils 222 arranged on the stator core 221. The stator core 221 is defined by laminated steel sheets. The circuit board 26 is arranged on the mounting plate 21. The preload magnet 27 is arranged on a portion of an upper surface of the stator core 221 which is radially inward of the coils 222.

The rotating portion 4 includes a rotor holder 41, which is substantially in the shape of a covered cylinder, a rotor magnet 42, a shaft 43, and an annular rubber 44. The rotor holder 41 is made of a magnetic material, and is arranged to cover the stator 22. The rotor holder 41 is fixed to an upper portion of the shaft 43 above the stator 22. The rotor holder 41 includes a cover portion, a cylindrical portion 412, and a cylindrical shaft fixing portion 413. The cover portion constitutes a disk mount portion 411. The disk mount portion 411 is arranged to extend substantially perpendicularly to the central axis J1, with a portion of the disk mount portion 411 spreading around the chucking device 5. The chucking device 5 is arranged at the upper portion of the shaft 43.

The annular rubber 44 is arranged on an outer circumferential portion of an upper surface of the disk mount portion 411. The disk 9 is mounted indirectly on the disk mount portion 411 with the annular rubber 44 intervening therebetween. The preload magnet 27 is arranged axially opposite the disk mount portion 411. That is, the preload magnet 27 is arranged axially opposite the cover portion of the rotor holder 41. A magnetic attraction force acts between the preload magnet 27 and the disk mount portion 411 to apply a preload between the stationary portion 2 and the rotating portion 4. Rotation of the rotating portion 4 is thereby stabilized.

The cylindrical portion 412 is arranged to extend downward from an outer edge portion of the disk mount portion 411. The rotor magnet 42 is arranged inside an inner circumferential surface of the cylindrical portion 412. The rotor magnet 42 is fixed directly or indirectly to the cylindrical portion 412. The stator 22 is arranged radially inside the rotor magnet 42. During drive of the motor 1, magnetic action occurs between the rotor magnet 42 and the stator 22. The shaft fixing portion 413 is arranged at a center of the disk mount portion 411. The upper portion of the shaft 43 is inserted in the shaft fixing portion 413. The shaft 43 is inserted in a hole of the sleeve 23. The shaft 43 and the rotor holder 41 are supported by the sleeve 23 such that each of the shaft 43 and the rotor holder 41 is rotatable about the central axis J1.

The chucking device 5 includes a center case 51, a plurality of claw members 52, a plurality of coil springs 53, and a plurality of center adjustment claws 54. The claw members 52 are arranged in a circumferential direction, and are arranged to project radially outward from the center case 51. The coil springs 53 are accommodated in the center case 51, and are arranged to press the claw members 52 radially outward. In place of the coil springs 53, elastic members of another type, such as rubber, may be used in the motor 1. Each of the center adjustment claws 54 is arranged between a separate pair of adjacent ones of the claw members 52.

When the disk 9 is fixed above the disk mount portion 411, the disk 9 is brought into contact with the claw members 52. At this time, a top of each claw member 52 is depressed and moved radially inward. The disk 9 is mounted above the disk mount portion 411 while being centered on the disk mount portion 411 by the center adjustment claws 54 so that a center of the disk 9 will coincide with the central axis J1. At this time, the tops of the claw members 52 are moved upwardly of the disk 9, and pressed by the coil springs 53 to return radially outward. The disk 9 is fixed onto the disk mount portion 411 while radially outward and downward forces are being applied to the disk 9 by the claw members 52.

Figure 3:
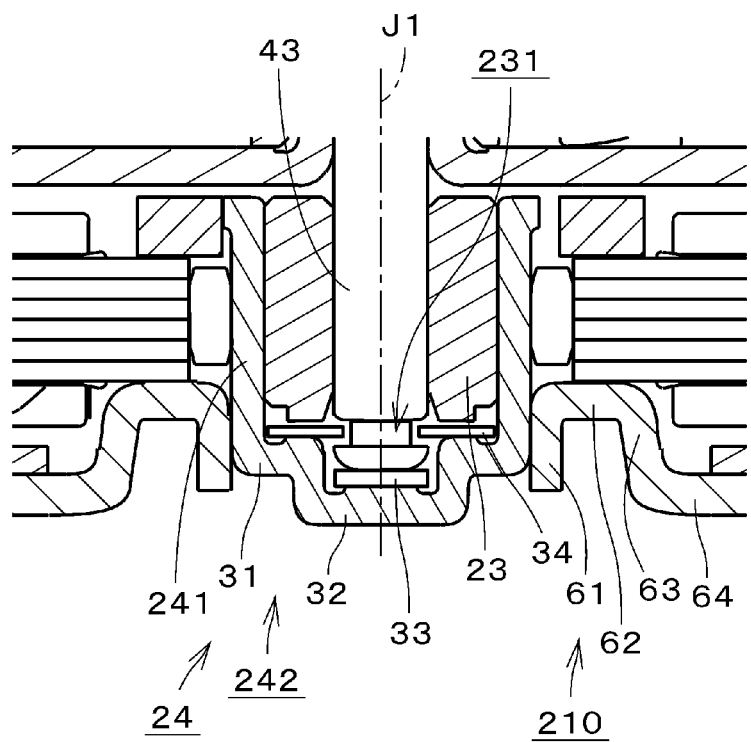
FIG. 3 is a diagram illustrating a sleeve and its vicinity according to the above preferred embodiment in an enlarged form.

FIG. 3 is a diagram illustrating the sleeve 23 and its vicinity in an enlarged form. The sleeve 23 is defined by an oil-bearing porous sintered metal body. The bushing 24 is shaped by subjecting a magnetic material to press working. This makes it possible to manufacture the bushing 24 at a low cost. The bushing 24 includes a substantially cylindrical "bushing cylindrical portion" 241 and a bushing bottom portion 242. The sleeve 23 is inserted in the bushing cylindrical portion 241. The bushing bottom portion 242 is arranged to close a lower end of the bushing cylindrical portion 241.

The bushing bottom portion 242 includes a "bottom portion circumferential portion" 31 and a central recessed portion 32. The bottom portion circumferential portion 31 is arranged to extend radially inward from a lower end of the bushing cylindrical portion 241. The central recessed portion 32 is recessed downward radially inside the bottom portion circumferential portion 31. In other words, the bushing bottom portion 242 includes a shoulder. A lower portion of the bushing 24 is thereby improved in rigidity compared to the case where the bushing 24 is arranged to have a flat bottom portion. A disk-shaped thrust plate 33 is arranged on an inner bottom surface of the central recessed portion 32. The thrust plate 33 is made of a resin. A lower end of the shaft 43 is arranged to be in contact with an upper surface of the thrust plate 33. The shaft 43 is thereby supported axially.

A coming-off preventing portion 34 is arranged on the bottom portion circumferential portion 31. The coming-off preventing portion 34 is plate-shaped and in the shape of a circular ring. The coming-off preventing portion 34 is made of a resin. Note that the shape of the coming-off preventing portion 34 is not limited to the shape of the circular ring as long as the coming-off preventing portion 34 is annular. Furthermore, the coming-off preventing portion 34 does not need to be completely annular. For example, the coming-off preventing portion 34 may be in the shape of the letter "C". A lower portion of the shaft 43 includes a groove portion 231 defined along an outer circumference thereof. The groove portion 231 is recessed toward the central axis J1 throughout its entire circumference. The diameter of a bottom surface of the groove portion 231, i.e., the minimum diameter of the groove portion 231, is arranged to be smaller than the inside diameter of the coming-off preventing portion 34. The diameter of the shaft 43 is arranged to be greater than the inside diameter of the coming-off preventing portion 34. Accordingly, an inner edge portion of the coming-off preventing portion 34 is arranged in the groove portion 231.

Meanwhile, a portion of the coming-off preventing portion 34 which is radially outward of the inner edge portion of the coming-off preventing portion 34 is arranged between the bottom portion circumferential portion 31 and a lower end of the sleeve 23 with the lower end of the sleeve 23 positioned above and the bottom portion circumferential portion 31 positioned below. Axial movement of the coming-off preventing portion 34 is restricted by a portion of the coming-off preventing portion 34 being positioned between the bottom portion circumferential portion 31 and the sleeve 23. Moreover, a contact of the inner edge portion of the coming-off preventing portion 34 with the groove portion 231 prevents the shaft 43 from coming off the sleeve 23.

The central portion 210 of the mounting plate 21 includes a substantially cylindrical "fixing cylindrical portion" 61, an annular upper plate portion 62, and an annular circumferential portion 63. A remaining portion of the mounting plate 21 excluding the central portion 210 will be hereinafter referred to as a mounting portion 64. A lower portion of the bushing cylindrical portion 241 is press fitted to the fixing cylindrical portion 61. The annular upper plate portion 62 is arranged to extend radially outward from an upper portion of the fixing cylindrical portion 61. The annular circumferential portion 63 is arranged to extend downward from an outer edge of the annular upper plate portion 62. More precisely, the annular circumferential portion 63 is arranged to extend slightly radially outward while extending downward from the outer edge of the annular upper plate portion 62. The mounting portion 64 is arranged to extend radially outward from a lower portion of the annular circumferential portion 63. It is possible to easily change the axial position of the stator 22 by changing the extent to which the central portion 210 projects upward in a designing stage.

Figure 4:
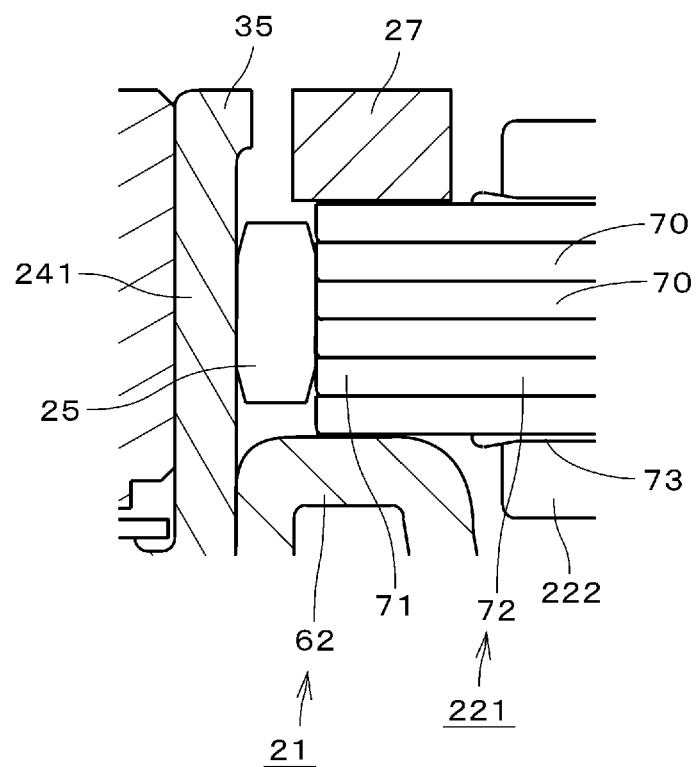
FIG. 4 is a diagram illustrating a spacer and its vicinity according to the above preferred embodiment in an enlarged form.

Referring to FIG. 4, the spacer 25 is fixed to an outer circumferential surface of the bushing cylindrical portion 241 with an inner circumferential surface of the spacer 25, which is annular, being in contact with the outer circumferential surface of the bushing cylindrical portion 241. The spacer 25 is made of a resin. An outer circumferential surface of the spacer 25 and an inner circumferential surface of the stator core 221 are arranged to be in contact with each other. A center of the stator core 221 is thereby easily positioned on the central axis J1. The bushing cylindrical portion 241 includes a flange portion 35 arranged to project radially outward at an upper end thereof. The flange portion 35 is shaped by drawing, and is therefore able to maintain sufficient strength. The spacer 25 is arranged to have an outside diameter greater than the outside diameter of the flange portion 35.

The stator core 221 includes an annular core back 71 and a plurality of teeth 72. The teeth 72 are arranged to extend radially outward from the core back 71. Each coil 222 is defined around a separate one of the teeth 72 with an insulating member 73 intervening therebetween. The insulating member 73 may be either a coating film or a resin-molded article. Each coil 222 is arranged on the insulating member 73. No portion of the insulating member 73 is arranged on either an upper surface or a lower surface of the core back 71. The lower surface of the core back 71 and an upper surface of the annular upper plate portion 62 are fixed to each other through an adhesive. That is, the stator core 221 and the annular upper plate portion 62 are fixed to each other through the adhesive. In other words, the lower surface of the core back 71 is arranged to be in substantially direct contact with the upper surface of the annular upper plate portion 62. This enables a heat generated in the stator 22 to be removed through the mounting plate 21, and also achieves a reduction in vibrations of the stator 22. Use of the adhesive makes it possible to securely fix the stator core 221 through the mounting plate 21 even when the spacer 25 is made of the resin. The lower surface of the core back 71 may be arranged to be in indirect contact with the upper surface of the annular upper plate portion 62 to achieve the reduction in the vibrations of the stator 22. The core back 71 is arranged to have an outside diameter greater than or equal to the outside diameter of the annular upper plate portion 62.

The preload magnet 27 is arranged to be in direct contact with the upper surface of the core back 71 with no portion of the insulating member 73 intervening therebetween. In the motor 1, the core back 71 is used as a yoke of the preload magnet 27. An upper surface of the preload magnet 27 is arranged at the same axial position as that of an upper surface of the flange portion 35. An inner circumferential surface of the preload magnet 27 is arranged radially inward of the inner circumferential surface of the stator core 221 so that the area of the preload magnet 27 in a plan view will increase. Note that only a portion of the inner circumferential surface of the preload magnet 27 may be arranged radially inward of the inner circumferential surface of the stator core 221. The upper surface of the preload magnet 27 is arranged at a level higher than that of an upper end of the spacer 25. Alternatively, the upper surface of the preload magnet 27 may be arranged at the same axial position as that of the upper end of the spacer 25. In addition, the preload magnet 27 is arranged to have an axial thickness greater than the axial thickness of an outer circumferential portion of the flange portion 35. This achieves an increased permeance coefficient of the preload magnet 27, and reduces demagnetization even when a low-grade magnet is used as the preload magnet 27.

Figure 5:
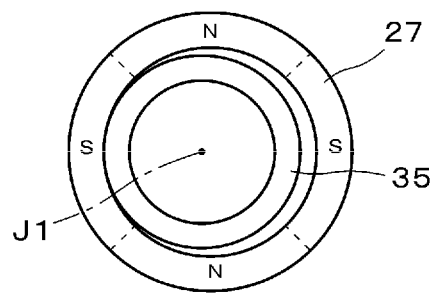
FIG. 5 is a plan view illustrating a preload magnet and a flange portion according to the above preferred embodiment.

FIG. 5 is a diagram illustrating the preload magnet 27 and the flange portion 35 when viewed from above. The preload magnet 27 is in the shape of a circular ring. The preload magnet 27 is polarized in a regular cycle in the circumferential direction. In an exemplary case of FIG. 5, two north poles and two south poles are arranged in the upper surface of the preload magnet 27 such that the north and south poles alternate with each other. As for the axial arrangement of the north and south poles, the north and south poles are arranged one upon the other in the axial direction. Note that an entire upper portion of the preload magnet 27 may be uniformly polarized into one of the north and south poles while an entire lower portion of the preload magnet 27 is uniformly polarized into the other of the north and south poles.

A center of the preload magnet 27 is displaced from the central axis J1. The inner circumferential surface of the preload magnet 27 is arranged to be in partial contact with an outer circumferential surface of the flange portion 35. This enables displacement of the center of the preload magnet 27 from the central axis J1 to be easily fixed in each of a multiplicity of motors 1 manufactured. This leads to reducing variation in the preload applied between the disk mount portion 411 and the preload magnet 27. The preload magnet 27 is preferably arranged in such a manner that a circumferential middle of one of the magnetic poles is in contact with the bushing cylindrical portion 241. Since the preload magnet 27 and the bushing cylindrical portion 241 are strongly attracted to each other at the middle of the magnetic pole, the above arrangement of the preload magnet 27 contributes to further reducing the variation in the preload between the multiplicity of motors 1 manufactured.

In order to obtain the preload effectively, the radial thickness of the bushing cylindrical portion 241 is preferably arranged to be greater than a distance by which the flange portion 35 projects from the outer circumferential surface of the bushing cylindrical portion 241. In addition, a maximum radial distance between the inner circumferential surface of the preload magnet 27 and the outer circumferential surface of the flange portion 35 is preferably arranged to be smaller than the distance by which the flange portion 35 projects from the outer circumferential surface of the bushing cylindrical portion 241.

Referring to FIG. 4, the stator core 221 is defined by a plurality of magnetic steel sheets 70 placed one upon another in the axial direction. Each magnetic steel sheet 70 is shaped by press forming. When each magnetic steel sheet 70 is shaped, a portion of the magnetic steel sheet 70 which is inside an inner end of a portion of the magnetic steel sheet 70 which corresponds to the core back 71 is punched upward relative to the portion of the magnetic steel sheet 70 which corresponds to the core back 71 in a condition illustrated in FIG. 4. Accordingly, a lower edge of an inner circumference of the magnetic steel sheet 70 is slightly smoothly curved in a section. An upper edge of the inner circumference of the magnetic steel sheet 70 is sharp in the section. This prevents a burr defined at the inner end of the magnetic steel sheet 70 from interfering with the mounting plate 21, and makes it possible to accurately set the axial position of the stator 22. Moreover, as described below, it is possible to easily fit the stator 22 to the spacer 25 from above the spacer 25.

Figure 6:
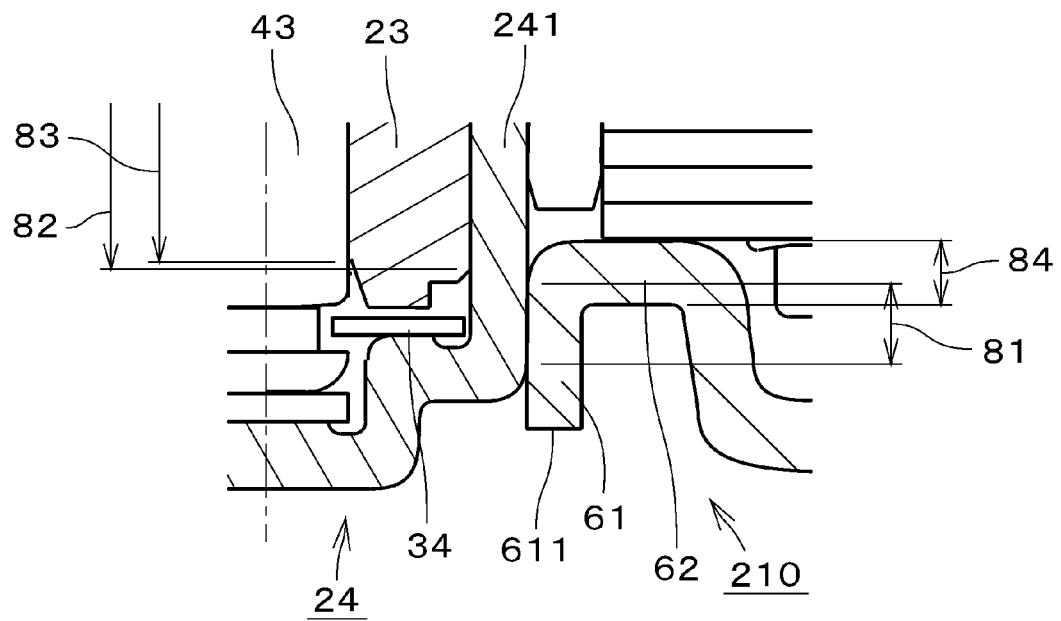
FIG. 6 is a diagram illustrating a lower portion of a bushing and a central portion of a mounting plate according to the above preferred embodiment in an enlarged form.

FIG. 6 is a diagram illustrating the lower portion of the bushing 24 and the central portion 210 of the mounting plate 21 in an enlarged form. An axially extending area of contact between an inner circumferential surface of the fixing cylindrical portion 61 and the outer circumferential surface of the bushing cylindrical portion 241 will be hereinafter referred to as a "bushing press-fit area". In FIG. 6, the axial range of the bushing press-fit area is indicated by reference numeral "81". An axially extending area of contact between an outer circumferential surface of the sleeve 23 and an inner circumferential surface of the bushing cylindrical portion 241 will be hereinafter referred to as a "sleeve fixing area". The axial range of the sleeve fixing area is indicated by reference numeral "82". A gap defined between an inner circumferential surface of the sleeve 23 and an outer circumferential surface of the shaft 43 and which supports the shaft 43 will be hereinafter referred to as a "radial gap". The axial range of the radial gap is indicated by reference numeral "83". In addition, the axial range of extension of the annular upper plate portion 62 is indicated by reference numeral "84".

In the motor 1, a lower end 611 of the fixing cylindrical portion 61 is arranged at a level lower than that of a lower end of the bushing press-fit area 81. A lower portion of the bushing press-fit area 81 is an area where the bushing 24 has high rigidity, and a sufficient axial dimension of the bushing press-fit area 81 is achieved by arranging the lower end 611 at a lower level. This leads to an improvement in strength with which the bushing 24 is fixed to the mounting plate 21. This in turn eliminates or reduces the likelihood that the bushing 24 will tilt. Moreover, each of a lower end of the sleeve fixing area 82 and a lower end of the radial gap 83 is arranged at a level higher than that of an upper end of the bushing press-fit area 81. This prevents a deformation of the bushing cylindrical portion 241 caused by press fit of the bushing cylindrical portion 241 to the fixing cylindrical portion 61 from deforming the inner circumferential surface of the sleeve 23, and thereby prevents a reduction in bearing performance. Note that only one of the lower end of the sleeve fixing area 82 and the lower end of the radial gap 83 may be arranged at a level higher than that of the upper end of the bushing press-fit area 81. Even in this case, deformation of the inner circumferential surface of the sleeve 23 can be prevented.

A portion of the sleeve 23 below the sleeve fixing area 82 is spaced radially inward from the inner circumferential surface of the bushing cylindrical portion 241. This makes it possible to lower the lower end of the sleeve 23, and thereby reduce a range over which the coming-off preventing portion 34 is movable. Moreover, a portion of the sleeve 23 below the radial gap 83 is spaced radially outward from the outer circumferential surface of the shaft 43. In the case of the motor 1, the inner circumferential surface of the sleeve 23 is subjected to sizing after the sleeve 23 is press fitted to the bushing 24. The above-described structure enables an entire portion of the inner circumferential surface of the sleeve 23 which defines the radial gap 83 to be subjected to the sizing even when it is impossible to pass a sizing bar completely through the sleeve 23. Furthermore, a bottom portion of the inner circumferential surface of the sleeve 23 is an inclined surface, and an oil buffer is defined between the shaft 43 and a bottom portion of the sleeve 23.

In the motor 1, the axial position of the upper end of the bushing press-fit area 81 is within the axial range 84 of the extension of the annular upper plate portion 62. The central portion 210 has high rigidity at a junction of the annular upper plate portion 62 with the fixing cylindrical portion 61. Therefore, the above-described structure achieves an additional improvement in the strength with which the bushing 24 is fixed to the mounting plate 21.

Since the spacer 25 is made of the resin, a deformation of the bushing 24 is prevented when the bushing 24 is press fitted to the spacer 25 and when the stator 22 is fitted to the spacer 25. Moreover, the bushing 24 and the spacer 25 have significantly different natural frequencies, and therefore, a reduction in vibrations and noise of the motor 1 is achieved. The spacer 25 makes it difficult for the heat generated in the stator 22 to be transferred to the bushing 24, and this leads to an improved life of a bearing mechanism.

Figure 7:
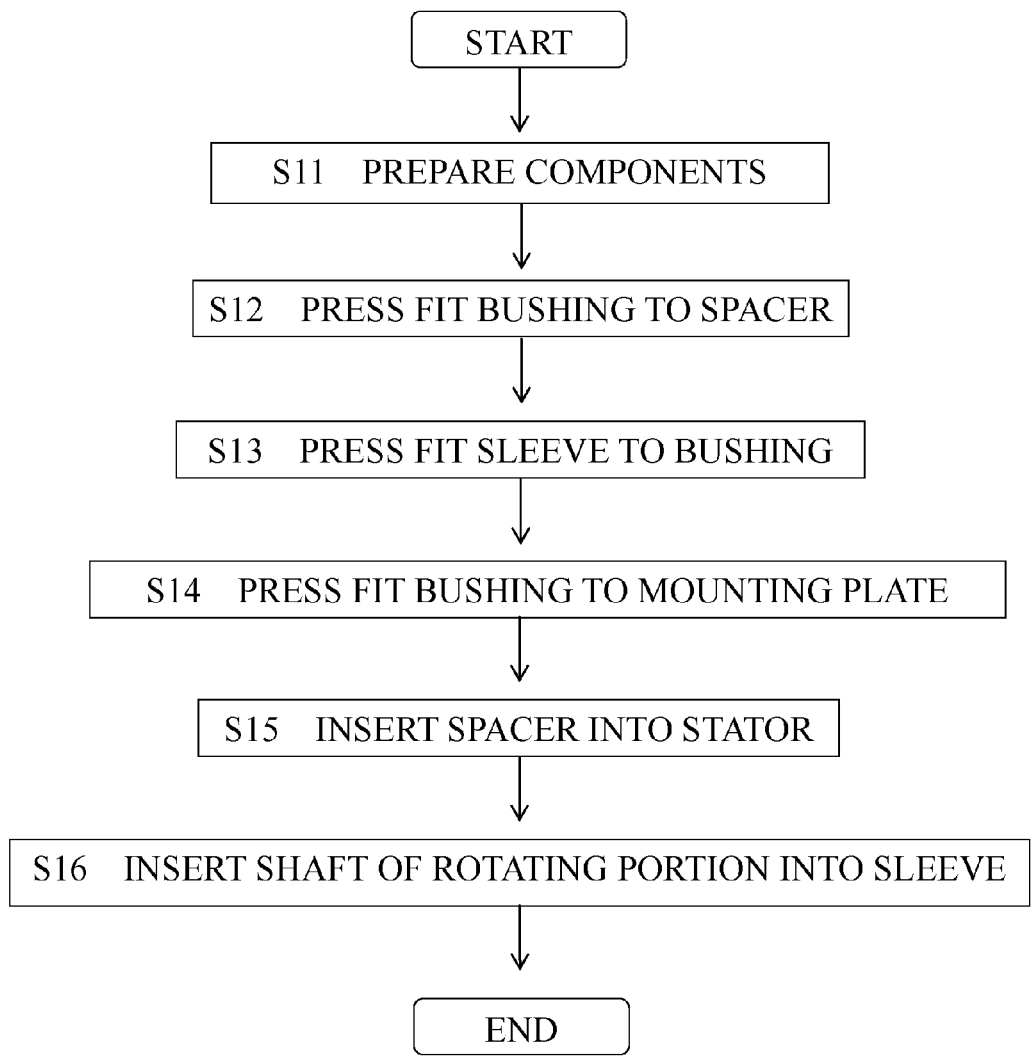
FIG. 7 is a flowchart illustrating a flow of assembling the motor.

FIG. 7 is a flowchart illustrating a flow of assembling the motor 1. First, various components and assemblies, such as the sleeve 23, the bushing 24, the mounting plate 21, the stator 22, and the rotating portion 4, are prepared (step S11). Note that each of the bushing 24 and the mounting plate 21 is shaped by subjecting a plate material to press working.

Next, the bushing 24 is press fitted to the spacer 25, which is substantially annular (step S12). As a result, the spacer 25 is arranged on the outer circumferential surface of the bushing cylindrical portion 241. The outside diameter of the spacer 25 is greater than the outside diameter of the flange portion 35. The sleeve 23 is press fitted to the bushing 24 (step S13). Note that step S13 may be performed before step S12. Note, however, that the thrust plate 33 and the coming-off preventing portion 34 are arranged on a bottom portion of the bushing 24 before the sleeve 23 is press fitted to the bushing 24. The mounting plate 21 is fitted to the lower portion of the bushing cylindrical portion 241 from below (step S14). As a result, the lower portion of the bushing cylindrical portion 241 is press fitted in the fixing cylindrical portion 61.

The stator core 221 of the stator 22 is fitted to the outer circumferential surface of the spacer 25 from above (step S15). In other words, an assembly made up of the bushing 24, the spacer 25, and so on is inserted into a central hole of the stator core 221 while the stator 22 is moved downward. The spacer 25 enables the center of the stator core 221 to easily coincide with a center of the bushing 24. In the motor 1, both the diameter of the outer circumferential surface of the spacer 25 and the diameter of the inner circumferential surface of the stator core 221 are greater than the diameter of the outer circumferential surface of the flange portion 35. Therefore, it is possible to attach the stator 22 to the spacer 25 from above. Moreover, a top portion of the outer circumferential surface of the spacer 25 includes an inclined surface which is angled radially outward with decreasing height, and this facilitates the attachment of the stator 22.

Finally, the shaft 43 of the rotating portion 4 is inserted into the sleeve 23 (step S16). At this time, the coming-off preventing portion 34 undergoes elastic deformation, and a portion of the coming-off preventing portion 34 enters into the groove portion 231 of the shaft 43. Note that insertion between any two of the stator 22, the sleeve 23, the bushing 24, and the spacer 25 during the above-described assembling operation may be either press fit or insertion not involving press fit.

Figure 8:
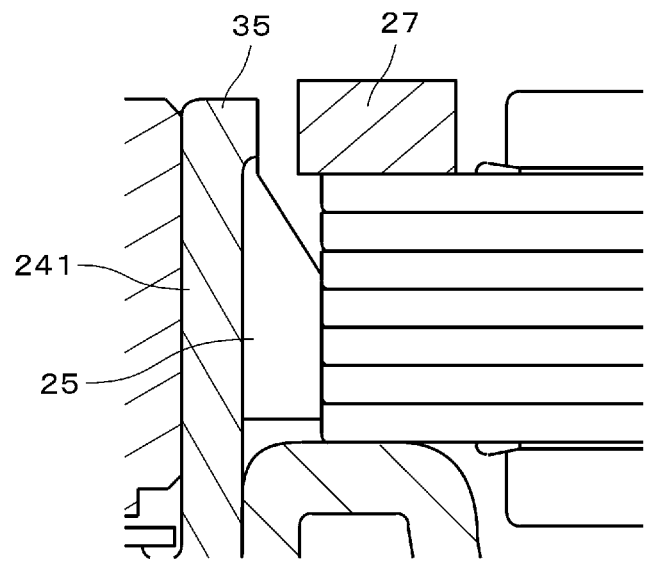
FIG. 8 is a cross-sectional view illustrating a spacer according to a modification of the above preferred embodiment.

FIG. 8 is a cross-sectional view illustrating a spacer 25 according to a modification of the above-described preferred embodiment. The structure of a motor according to the present modification is similar to the structure of the motor 1 illustrated in FIG. 2 except in the structure of the spacer 25. The spacer 25 illustrated in FIG. 8 is molded on the outer circumferential surface of the bushing cylindrical portion 241 by an insert molding process. The spacer 25 is arranged to be in contact with a lower end of the flange portion 35, and an upper surface of the spacer 25 is angled downward with increasing distance from the central axis J1 in order to avoid an interference with the preload magnet 27. A process of molding the spacer 25 by the insert molding process is performed in place of step S12 in the flowchart of FIG. 7. In this case, step S12 is performed before step S13.

Figure 9:
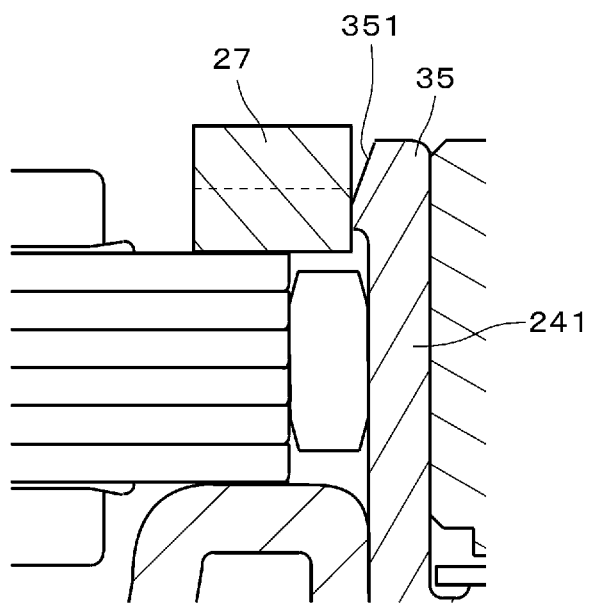
FIG. 9 is a cross-sectional view illustrating a bushing cylindrical portion according to a modification of the above preferred embodiment.

FIG. 9 is a cross-sectional view illustrating a bushing cylindrical portion 241 according to a modification of the above-described preferred embodiment. Also in the modification illustrated in FIG. 9, the center of the preload magnet 27 is displaced from the central axis J1. FIG. 9 illustrates sections of the bushing cylindrical portion 241, the preload magnet 27, and so on taken along a plane including a point of contact between a flange portion 35 and the preload magnet 27.

In the bushing cylindrical portion 241 illustrated in FIG. 9, an upper portion of an outer circumferential surface of the flange portion 35 is an inclined surface 351 which is angled radially inward with increasing height. That is, an upper end portion of an outer circumferential surface of the bushing cylindrical portion 241 includes the inclined surface 351, which extends radially inward with increasing height. The upper portion of the preload magnet 27 is polarized into one of the north and south poles, while the lower portion of the preload magnet 27 is polarized into the other of the north and south poles. A lower end of the inclined surface 351 is arranged to be in contact with the inner circumferential surface of the preload magnet 27 below an axial middle of the preload magnet 27. A lower portion of the outer circumferential surface of the flange portion 35 is arranged to be in contact with the inner circumferential surface of the preload magnet 27 in the sections illustrated in FIG. 9.

Accordingly, at least a portion of the preload magnet 27 which extends from the axial middle to an upper end of the preload magnet 27 is spaced away from the bushing cylindrical portion 241 all the way around a circumference of the bushing cylindrical portion 241. In other words, a gap extending all the way around a circumference of the bushing cylindrical portion 241 is defined between the bushing cylindrical portion 241 and at least the portion of the preload magnet 27 which extends from the axial middle to the upper end of the preload magnet 27. As a result, a magnetic loop passing from the preload magnet 27 back to the preload magnet 27 through the flange portion 35 and the disk mount portion 411 is defined, so that the preload caused by the preload magnet 27 can be effectively obtained. That is, an upper portion of the bushing cylindrical portion 241 functions as the yoke of the preload magnet 27.

Note that a gap extending all the way around the circumference of the bushing cylindrical portion 241 may only be defined between the bushing cylindrical portion 241 and at least an axially upper end of the preload magnet 27. Even in this case, an improvement in the preload can be achieved compared to the case where the preload magnet 27 is arranged to be in contact with the bushing cylindrical portion 241 throughout its entire axial extension at a circumferential position.

In the present modification illustrated in FIG. 9, as well as in the above-described preferred embodiment illustrated in FIG. 4, the axial thickness of the preload magnet 27 is arranged to be greater than the axial thickness of an outer circumferential portion of the flange portion 35, the outer circumferential portion including the inclined surface 351. This makes it easier to arrange the preload magnet 27 closer to the disk mount portion 411 in a design of the motor, making it possible to easily obtain a preload effect. In order to obtain the preload effectively, a maximum radial distance between the inner circumferential surface of the preload magnet 27 and the lower end of the inclined surface 351 is preferably arranged to be equal to or shorter than the radial width of the inclined surface 351.

Figure 10:
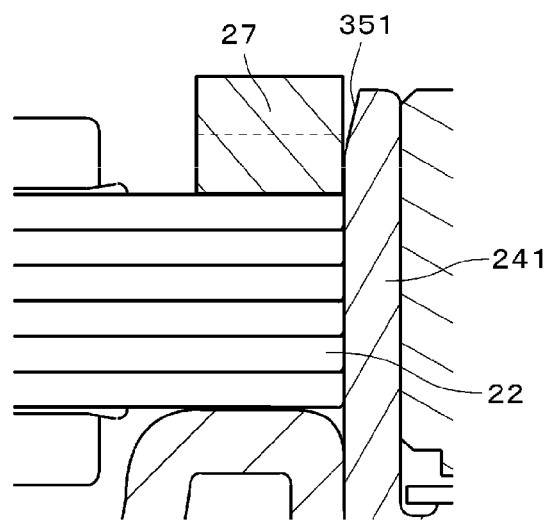
FIG. 10 is a cross-sectional view illustrating a bushing cylindrical portion according to another modification of the above preferred embodiment.

FIG. 10 is a cross-sectional view illustrating a bushing cylindrical portion 241 according to a modification of the above-described preferred embodiment. Also in the modification illustrated in FIG. 10, the center of the preload magnet 27 is displaced from the central axis J1. FIG. 10 illustrates sections of the bushing cylindrical portion 241, the preload magnet 27, and so on taken along a plane including a point of contact between the bushing cylindrical portion 241 and the preload magnet 27.

The bushing cylindrical portion 241 illustrated in FIG. 10 is not provided with the flange portion 35. This makes it possible to increase the radial width of the preload magnet 27. An upper end portion of an outer circumferential surface of the bushing cylindrical portion 241 includes an inclined surface 351 which is angled radially inward with increasing height. A lower end of the inclined surface 351 is joined to a cylindrical portion of the outer circumferential surface of the bushing cylindrical portion 241. As is the case with the modification illustrated in FIG. 9, the lower end of the inclined surface 351 is arranged to be in contact with the inner circumferential surface of the preload magnet 27 below the axial middle of the preload magnet 27. Accordingly, at least the portion of the preload magnet 27 which extends from the axial middle to the upper end of the preload magnet 27 is spaced away from the bushing cylindrical portion 241 all the way around a circumference of the bushing cylindrical portion 241. As a result, a magnetic loop passing from the preload magnet 27 back to the preload magnet 27 through an upper portion of the bushing cylindrical portion 241 and the disk mount portion 411 is defined, so that the preload caused by the preload magnet 27 can be effectively obtained.

A bushing 24 according to the present modification illustrated in FIG. 10 is also shaped by subjecting a plate material to press working. Because of provision of the inclined surface 351, an upper end of the outer circumferential surface of the bushing cylindrical portion 241 has a diameter smaller than that of a portion of the outer circumferential surface of the bushing cylindrical portion 241 below the upper end thereof. This makes it possible to fix the stator 22 to the outer circumferential surface of the bushing cylindrical portion 241 from above without use of the spacer 25. Moreover, it is also possible to cause a center of the stator 22 to coincide with the central axis J1 without use of the spacer 25.

Figure 11:
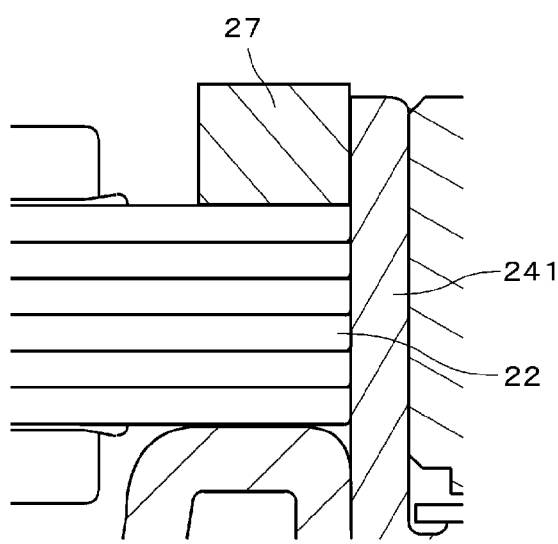
FIG. 11 is a cross-sectional view illustrating a bushing cylindrical portion according to yet another modification of the above preferred embodiment.

FIG. 11 is a cross-sectional view illustrating a bushing cylindrical portion 241 according to a modification of the above-described preferred embodiment. An outer circumferential surface of the bushing cylindrical portion 241 illustrated in FIG. 11 is a cylindrical surface having a uniform diameter up to an upper end thereof. Also in the modification illustrated in FIG. 11, the center of the preload magnet 27 is displaced from the central axis J1. FIG. 11 illustrates sections of the bushing cylindrical portion 241, the preload magnet 27, and so on taken along a plane including a point of contact between the bushing cylindrical portion 241 and the preload magnet 27.

A bushing 24 according to the present modification illustrated in FIG. 11 is also shaped by subjecting a plate material to press working. Because an upper end of the outer circumferential surface of the bushing cylindrical portion 241 has a diameter equal to the diameter of a portion of the outer circumferential surface of the bushing cylindrical portion 241 below the upper end thereof, it is possible to fit the stator 22 onto the outer circumferential surface of the bushing cylindrical portion 241 from above without use of the spacer 25.

Note that, in each of the above-described preferred embodiment and the modifications thereof, the upper surface of the preload magnet 27 may be arranged at the same axial position as that of an upper end of the bushing cylindrical portion 241, but preferably, the upper surface of the preload magnet 27 is arranged at a level higher than that of the upper end of the bushing cylindrical portion 241. This makes it easier to arrange the preload magnet 27 closer to the disk mount portion 411 in the design of the motor, making it possible to stably obtain the preload.

Figure 12:
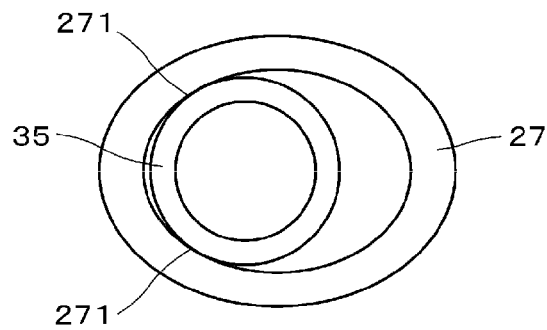
FIG. 12 is a plan view illustrating a preload magnet according to a modification of the above preferred embodiment.

FIG. 12 is a plan view illustrating a preload magnet 27 according to a modification of the above-described preferred embodiment. The preload magnet 27 is in the shape of an elliptical ring. The preload magnet 27 is arranged to be in contact with the flange portion 35 or the bushing cylindrical portion 241 at two positions 271. These positions 271 are naturally circumferentially within an angular range of less than 180 degrees. This prevents a great radial force from acting between the preload magnet 27 and the flange portion 35 or the bushing cylindrical portion 241, and thereby prevents a damage of the preload magnet 27. Note that, in the above-described preferred embodiment illustrated in FIG. 5, the preload magnet 27 is arranged to be in contact with the flange portion 35 or the bushing cylindrical portion 241 at one position.

Note that the preload magnet 27 and the bushing cylindrical portion 241 (or the flange portion 35 in the case where the flange portion 35 is provided) may be arranged to be in surface contact with each other, that is, in line contact with each other in a plan view. Even in this case, entire areas of contact between the preload magnet 27 and the bushing cylindrical portion 241 (or the flange portion 35) are circumferentially within the angular range of less than 180 degrees, and this makes it possible to easily set the position of the preload magnet 27, that is, the degree of displacement of the center of the preload magnet 27 from the central axis J1. This leads to an easy reduction in the variation in the preload. Moreover, since the preload magnet 27 and the bushing cylindrical portion 241 are not in a slight press fit condition, the preload magnet 27 is prevented from being damaged.

Figure 13:
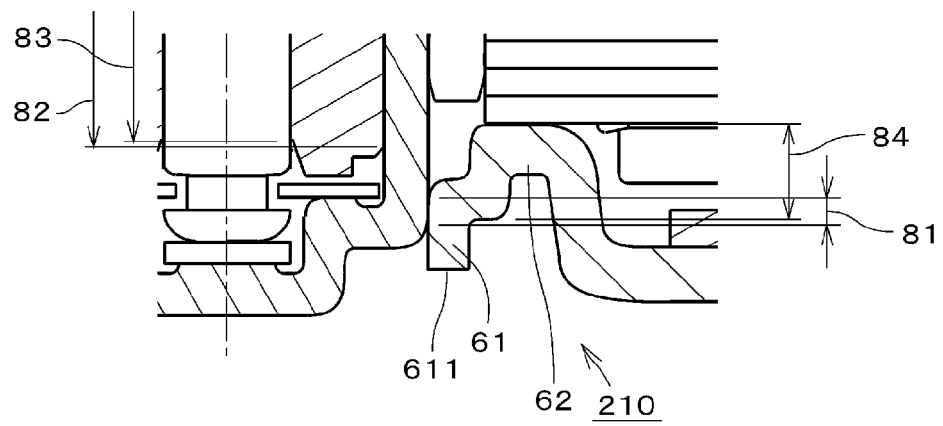
FIG. 13 is a cross-sectional view illustrating a central portion of a mounting plate according to a modification of the above preferred embodiment.

FIG. 13 is a cross-sectional view illustrating a central portion 210 of a mounting plate 21 according to a modification of the above-described preferred embodiment. An annular upper plate portion 62 of the central portion 210 includes a shoulder. Specifically, the annular upper plate portion 62 is arranged to extend radially outward from an upper portion of a fixing cylindrical portion 61, and bend upward and then bend radially outward. Accordingly, the axial range 84 of extension of the annular upper plate portion 62 is wider than the axial range 84 according to the above-described preferred embodiment illustrated in FIG. 6.

As is the case with the above-described preferred embodiment illustrated in FIG. 6, a lower end 611 of the fixing cylindrical portion 61 is arranged at a level lower than that of a lower end of a bushing press-fit area 81 in the modification illustrated in FIG. 13. Each of the lower end of the sleeve fixing area 82 and the lower end of the radial gap 83 is arranged at a level higher than that of an upper end of the bushing press-fit area 81. The axial position of the upper end of the bushing press-fit area 81 is within the axial range 84 of the extension of the annular upper plate portion 62.

Figure 14:
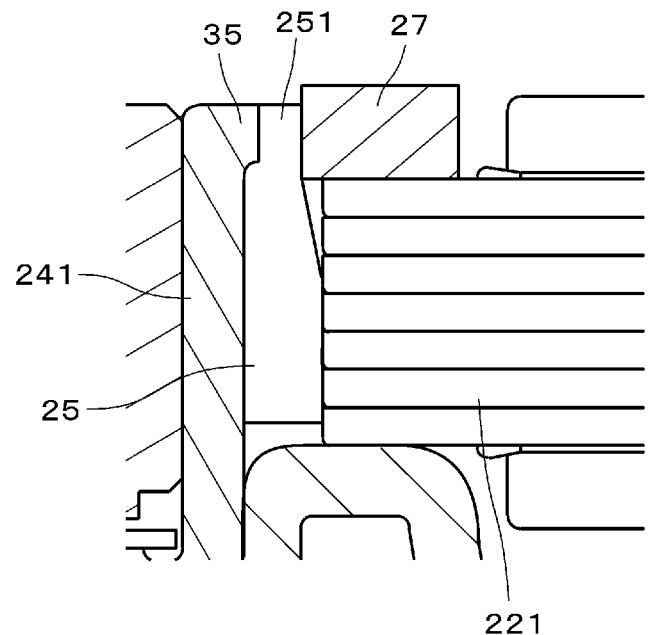
FIG. 14 is a cross-sectional view illustrating a spacer according to a modification of the above preferred embodiment.
Figure 15:
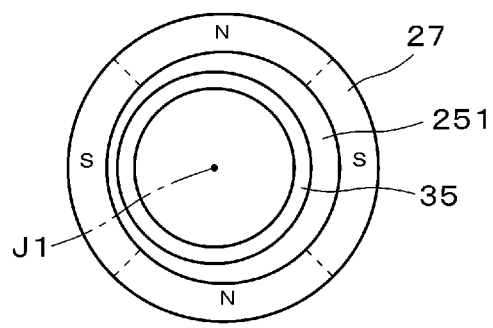
FIG. 15 is a plan view illustrating a flange portion, an upper portion of the spacer, and a preload magnet according to a modification of the above preferred embodiment.

FIG. 14 is a cross-sectional view illustrating a spacer 25 according to a modification of the above-described preferred embodiment. FIG. 15 is a plan view illustrating the flange portion 35, an upper portion 251 of the spacer 25, and the preload magnet 27 according to the present modification. The spacer 25 is molded on the outer circumferential surface of the bushing cylindrical portion 241 by an insert molding process. The upper portion 251 of the spacer 25 is arranged to cover the outer circumferential surface of the flange portion 35. The preload magnet 27 is arranged on the stator core 221 while being fitted to the upper portion 251 of the spacer 25. The upper surface of the preload magnet 27 is arranged at a level higher than that of an upper end of the spacer 25 in order to avoid an interference between the spacer 25 and the disk mount portion 411. Note that the upper surface of the preload magnet 27 may be arranged at the same axial position as that of the upper end of the spacer 25.

Also in the case where the spacer 25 illustrated in FIGS. 14 and 15 is used, the center of the preload magnet 27 is displaced from the central axis J1. A center of an outer circumferential surface of the upper portion 251 of the spacer 25 is displaced from the central axis J1 in order to arrange the preload magnet 27 in the above manner. The radial position of the preload magnet 27 is easily set by a contact of the outer circumferential surface of the upper portion 251 of the spacer 25 with the inner circumferential surface of the preload magnet 27.

Figure 16:
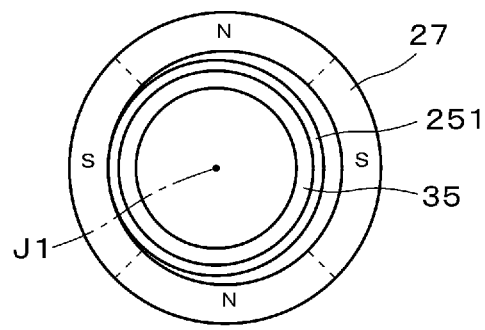
FIG. 16 is a plan view illustrating a flange portion, an upper portion of a spacer, and a preload magnet according to a modification of the above preferred embodiment.

Note that, as illustrated in FIG. 16, the center of the outer circumferential surface of the upper portion 251 of the spacer 25 may coincide with the central axis J1. Even in this case, a contact of the inner circumferential surface of the preload magnet 27 with only a portion of the outer circumferential surface of the upper portion 251 of the spacer 25 enables displacement of the center of the preload magnet 27 from the central axis J1 to be easily fixed in each of a multiplicity of motors manufactured.

Figure 17:
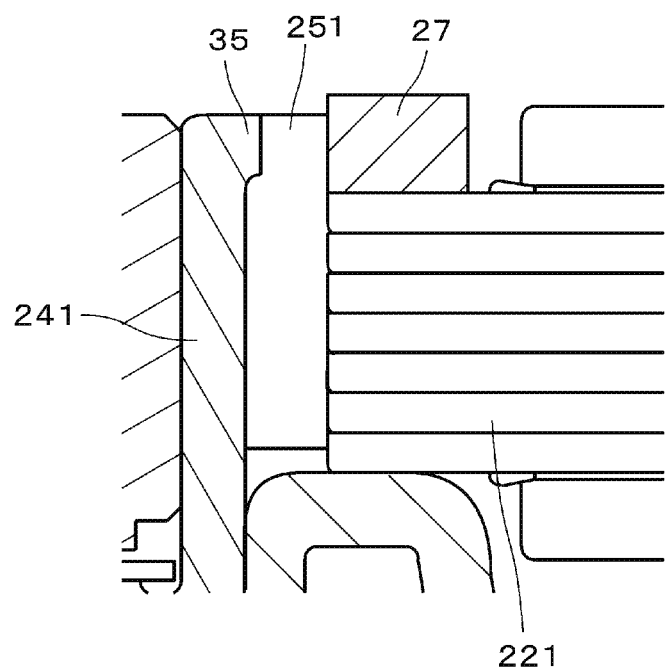
FIG. 17 is a cross-sectional view illustrating a spacer according to another modification of the above preferred embodiment.

FIG. 17 is a cross-sectional view illustrating a spacer 25 according to a modification of the above-described preferred embodiment. The spacer 25 is molded on the outer circumferential surface of the bushing cylindrical portion 241 by an insert molding process. An upper portion 251 of the spacer 25 is arranged to cover the outer circumferential surface of the flange portion 35. An outer circumferential surface of the spacer 25 is cylindrical. The stator core 221 is fitted to the outer circumferential surface of the spacer 25, and the preload magnet 27 is also fitted to the outer circumferential surface of the spacer 25. The inner circumferential surface of the stator core 221 and the inner circumferential surface of the preload magnet 27 are arranged to have the same diameter and a common center.

The spacer 25 may be used to accomplish positioning of the stator 22 and the preload magnet 27 in the above-described manner. The positioning of the stator 22 and the preload magnet 27 is thus easily accomplished. In the modification illustrated in FIG. 17, it is possible to fit both the stator 22 and the preload magnet 27 to the spacer 25 at the same time.

Figure 18:
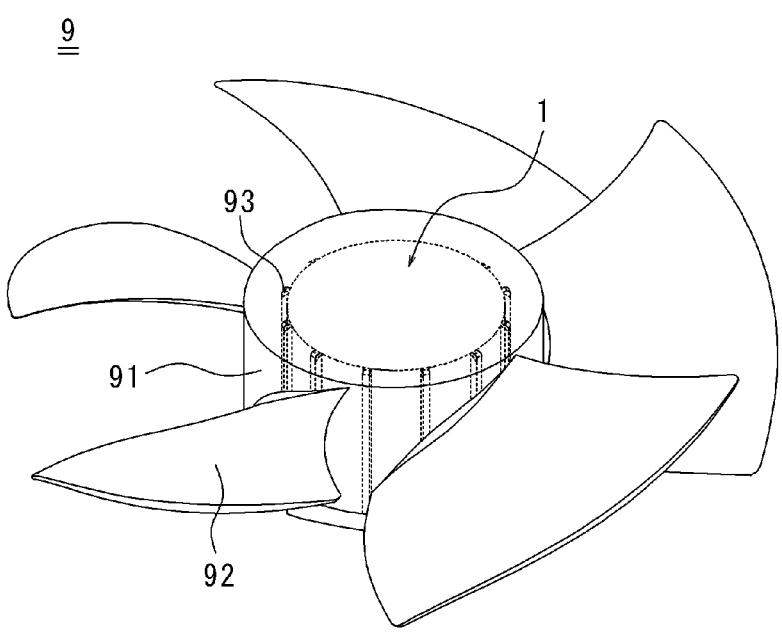
FIG. 18 is a perspective view of an axial fan according to a preferred embodiment of the present invention.
Figure 19:
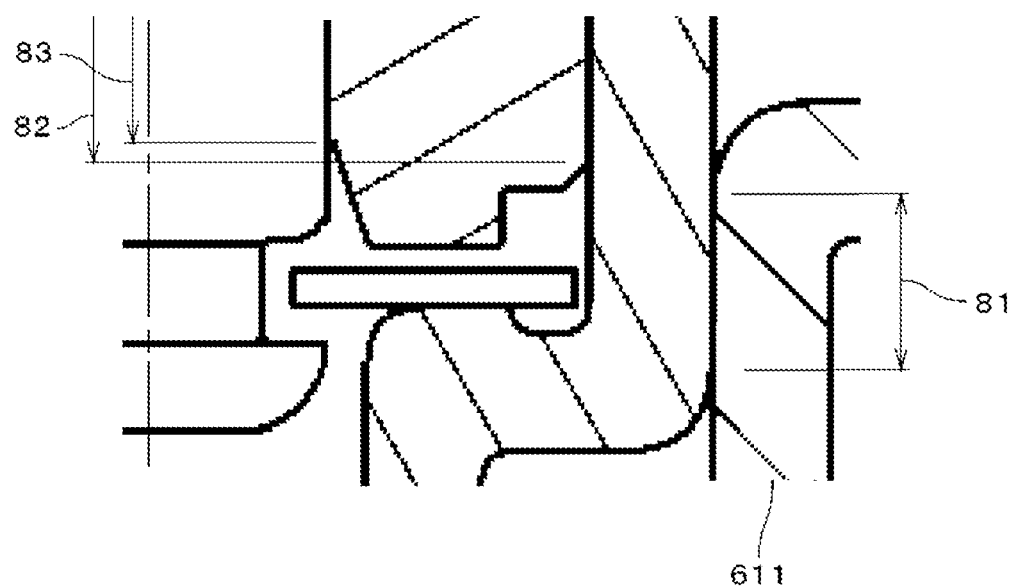
FIG. 19 is a partial enlarged view of the diagram as illustrated in FIG. 6.

FIG. 18 is a perspective view of an axial fan 9 according to a preferred embodiment of the present invention. The axial fan 9 includes the stationary portion 2, which is the stationary assembly, the rotating portion 4, which is the rotating assembly, and an impeller cup 91. The structure of each of the stationary portion 2 and the rotating portion 4 is illustrated in FIG. 2 and has been described above. The impeller cup 91 is substantially in the shape of a covered cylinder, and is fixed to the rotating portion 4 or is integrally defined with the rotating portion 4. The impeller cup 91 may be fixed to either the rotor holder 41 or the shaft 43. The stationary portion 2 is arranged to support both the rotating portion 4 and the impeller cup 91 such that the rotating portion 4 and the impeller cup 91 are rotatable about the central axis J1. The impeller cup 91 includes a plurality of blades 92 arranged on an outer circumferential surface thereof, and a plurality of ribs 93 arranged on an inner circumferential surface thereof. In the case where the impeller cup 91 is fixed to the rotor holder 41, the ribs 93 are arranged to be in contact with the rotor holder 41. The axial fan 9 is arranged to produce an air current, with an air drawn in from a top side and sent toward a bottom side, through counterclockwise rotation of the rotating portion 4 in FIG. 18.

While preferred embodiments of the present invention have been described above, it is to be understood that the present invention is not limited to the above-described preferred embodiments, and that a variety of modifications are possible.

The preload magnet 27 may be arranged indirectly on the stator core 221 with another member intervening therebetween. That is, the preload magnet 27 is arranged above the stator core 221. The preload magnet 27 may be in the shape of a closed ring other than the circular or elliptical ring.

Instead of the inclined surface 351 being defined in an upper portion of the outer circumferential surface of the bushing cylindrical portion 241, an inclined surface which is angled radially outward with increasing height may be defined in the inner circumferential surface of the preload magnet 27. Note that the upper end of the preload magnet 27 and the bushing cylindrical portion 241 may be spaced away from each other not through any inclined surface but through a shoulder or the like.

A shoulder, instead of the inclined surface, may be defined in the bottom portion of the inner circumferential surface of the sleeve 23. An inclined surface, instead of the shoulder, may be defined in a bottom portion of the outer circumferential surface of the sleeve 23.

The spacer 25 does not need to occupy all circumferential positions. For example, the spacer 25 may be in the shape of the letter "C" in a plan view. The bottom portion of the bushing 24 may not necessarily includes the central recessed portion. For example, the bottom portion of the bushing 24 may be in the shape of a flat plate.

While the axial fan 9 has been described above, the present invention is applicable not only to axial fans but also to other types of fans, such as centrifugal fans.

Features of the above-described preferred embodiments and the modifications thereof may be combined appropriately as long as no conflict arises.

The present invention is suitably applicable, in particular, to a motor of a disk drive apparatus, but is also applicable to motors used for a variety of other applications.

What is claimed is:

1. A motor comprising:
    a rotating portion; and
    a stationary portion arranged to support the rotating portion such that the rotating portion is rotatable about a central axis; wherein
    the rotating portion includes a shaft and a rotor magnet;
    the stationary portion includes:
        a sleeve including a hole in which the shaft is inserted, and arranged to rotatably support the shaft;
        a substantially cylindrical bushing having a bottom arranged to cover the sleeve;
        a mounting plate arranged to have the bushing fixed thereto; and
        a stator arranged around the bushing radially inside the rotor magnet;
    the stator includes a stator core and coils;
    the substantially cylindrical bushing includes:
        a bushing cylindrical portion that is substantially cylindrical-shaped and arranged to have the sleeve inserted therein; and
        a bushing bottom portion arranged to close an axial lower end of the bushing cylindrical portion;
    the mounting plate includes:
        a fixing cylindrical portion that is substantially cylindrical-shaped and arranged to have an axial lower portion of the bushing cylindrical portion press fitted thereto;
        an annular upper plate portion arranged to extend radially outward from an axial upper portion of the fixing cylindrical portion;
        an annular circumferential portion arranged to extend downward from an outer edge of the annular upper plate portion; and
        a mounting portion arranged to extend radially outward from axial lower portion of the annular circumferential portion;
    an axial lower end of the fixing cylindrical portion of the mounting plate is arranged at an axial level lower than that of an axial lower end of a bushing press-fit area an inner circumferential surface of the fixing cylindrical portion and an outer circumferential surface of the bushing cylindrical portion are in contact with each other; and
    at least one of an axial lower end of a sleeve fixing area and an axial lower end of a radial gap is arranged at an axial level higher than that of an axial upper end of the bushing press-fit area, wherein the sleeve fixing area is an area where an outer circumferential surface of the sleeve and an inner circumferential surface of the bushing cylindrical portion are in contact with each other, and wherein the radial gap is defined between an inner circumferential surface of the sleeve and an outer circumferential surface of the shaft such that the sleeve supports the shaft.

2. The motor according to claim 1, wherein an axial position of the axial upper end of the bushing press-fit area is within an axial range of extension of the annular upper plate portion.

3. The motor according to claim 1, wherein a portion of the sleeve below the sleeve fixing area is spaced radially inward from the inner circumferential surface of the bushing cylindrical portion.

4. The motor according to claim 1, wherein a portion of the sleeve below the radial gap is spaced radially outward from the outer circumferential surface of the shaft.

5. The motor according to claim 1, wherein
    the stationary portion further includes an annular coming-off preventing portion;
    an axial lower portion of the shaft includes a groove portion defined along an outer circumference thereof;
    an inner edge portion of the coming-off preventing portion is arranged in the groove portion;
    the bushing bottom portion includes:
        a bottom portion circumferential portion arranged to extend radially inward from an axial lower end of the bushing cylindrical portion; and
        a central recessed portion recessed downward radially inside the bottom portion circumferential portion; and
    a portion of the coming-off preventing portion is arranged between the bottom portion circumferential portion and an axial lower end of the sleeve.

6. The motor according to claim 1, wherein
    the stator core includes:
        an annular core back; and
        a plurality of teeth arranged to extend radially outward from the core back, each tooth having a separate one of the coils defined therearound with an insulating member intervening therebetween; and
    axial lower surface of the core back is arranged to be in direct or indirect contact with an axial upper surface of the annular upper plate portion.

7. The motor according to claim 6, wherein
    the stator core is defined by a plurality of magnetic steel sheets placed one upon another in an axial direction;
    each of the magnetic steel sheets is shaped by press forming; and
    an inner end of the magnetic steel sheet has been punched upward relative to the portion of the magnetic steel sheet corresponding to the core back.

8. The motor according to claim 6, wherein
    no insulating member is arranged on the axial lower surface of the core back; and
    the axial lower surface of the core back is arranged to be in direct contact with the axial upper surface of the annular upper plate portion.

9. The motor according to claim 6, wherein
    the rotating portion further includes a rotor holder in a shape of a covered cylinder, including a cover portion, and fixed to an axial upper portion of the shaft above the stator;
    the rotor holder is made of a magnetic material;
    the stationary portion further includes an annular preload magnet arranged above a portion of the stator core, the annular preload magnet being radially inward of the coils and arranged axially opposite the cover portion of the rotor holder;
    the preload magnet is annular, and is polarized either in a regular cycle or uniformly in a circumferential direction;
    a center of the preload magnet is displaced from the central axis; and
    an inner circumferential surface of the preload magnet is arranged to be in partial contact with the outer circumferential surface of the bushing cylindrical portion.

10. The motor according to claim 9, wherein
    the preload magnet is in a shape of an elliptical ring;

the preload magnet and the bushing cylindrical portion are arranged to be in contact with each other at two positions; and the two positions are circumferentially within an angular range of less than 180 degrees.

11. The motor according to claim 9, wherein an axial upper end portion of the outer circumferential surface of the bushing cylindrical portion includes an inclined surface angled radially inward with increasing height;

axial lower end of the inclined surface is joined to a cylindrical portion of the outer circumferential surface of the bushing cylindrical portion;

the axial lower end of the inclined surface is arranged to be in contact with the inner circumferential surface of the preload magnet below an axial middle of the preload magnet; and at least a portion of the preload magnet extending from the axial middle to an axial upper end of the preload magnet is spaced away from the bushing cylindrical portion all a way around a circumference of the bushing cylindrical portion.

12. The motor according to claim 1, wherein the stationary portion further includes an annular spacer fixed to the outer circumferential surface of the bushing cylindrical portion;

the bushing cylindrical portion includes a flange portion arranged to project radially outward at an axial upper end thereof;

the spacer is arranged to have an outside diameter greater than that of the flange portion; and an outer circumferential surface of the spacer and an inner circumferential surface of the stator core are arranged to be in contact with each other.

13. The motor according to claim 12, wherein the spacer is made of a resin; and the stator core and the annular upper plate portion are fixed to each other through an adhesive.

14. The motor according to claim 12, wherein the spacer has been molded on the outer circumferential surface of the bushing cylindrical portion by an insert molding process.

15. The motor according to claim 14, wherein the spacer is arranged to be in contact with axial lower end of the flange portion, and an axial upper surface of the spacer is angled downward with increasing distance from the central axis.

16. The motor according to claim 12, wherein the rotating portion further includes a rotor holder in a shape of a covered cylinder, including a cover portion, and fixed to an axial upper portion of the shaft above the stator;

the rotor holder is made of a magnetic material;

the stationary portion further includes an annular preload magnet arranged above a portion of the stator core, the annular preload magnet being radially inward of the coils and arranged axially opposite the cover portion of the rotor holder; and an axial upper surface of the preload magnet is arranged at axial level higher than or the same as that of an axial upper end of the spacer.

17. The motor according to claim 16, wherein the preload magnet is arranged to be in direct contact with the stator core without an insulating member intervening therebetween.

18. The motor according to claim 16, wherein at least a portion of an inner circumferential surface of the preload magnet is arranged radially inward of the inner circumferential surface of the stator core.

19. The motor according to claim 16, wherein the axial upper surface of the preload magnet is arranged at axial level higher than that of the axial upper end of the bushing cylindrical portion.

20. The motor according to claim 16, wherein the preload magnet is arranged to have an axial thickness greater than that of an outer circumferential portion of the flange portion.

21. The motor according to claim 16, wherein an outer circumferential surface of an axial upper portion of the spacer is arranged to be in contact with an inner circumferential surface of the preload magnet.

22. The motor according to claim 21, wherein the inner circumferential surface of the stator core and the inner circumferential surface of the preload magnet are arranged to have the same diameter and a common center.

23. The motor according to claim 16, wherein the preload magnet is in a shape of a circular ring, and is polarized either in a regular cycle or uniformly in a circumferential direction;

a center of the preload magnet is displaced from the central axis; and an inner circumferential surface of the preload magnet is arranged to be in contact with only a portion of an outer circumferential surface of an axial upper portion of the spacer.

24. The motor according to claim 16, wherein the preload magnet is in a shape of a circular ring, and is polarized either in a regular cycle or uniformly in a circumferential direction;

a center of the preload magnet is displaced from the central axis; and an inner circumferential surface of the preload magnet is arranged to be in partial contact with an outer circumferential surface of the flange portion.

25. The motor according to claim 24, wherein an axial upper portion of the outer circumferential surface of the flange portion includes an inclined surface angled radially inward with increasing height; and an axial lower end of the inclined surface is arranged to be in contact with the inner circumferential surface of the preload magnet below an axial middle of the preload magnet, and a gap extending all a way around a circumference of the bushing cylindrical portion is defined between the bushing cylindrical portion and at least a portion of the preload magnet extending from the axial middle to an axial upper end of the preload magnet.

26. The motor according to claim 1, further comprising a chucking device arranged at an axial upper portion of the shaft, and arranged to be fitted in a central hole of a disk.

27. A disk drive apparatus comprising:

the motor of claim 26 arranged to rotate a disk;

an access portion arranged to perform at least one of reading and writing of information from or to the disk; and a housing arranged to contain the motor and the access portion.

28. A fan comprising:

the motor of claim 1; and an impeller cup attached to the rotating portion.

* * * * *